J. W. MONTAGUE.
IGNITION MAGNETO DRIVING COUPLING.
APPLICATION FILED OCT. 6, 1914.
1,150,694.
Patented Aug. 17, 1915.
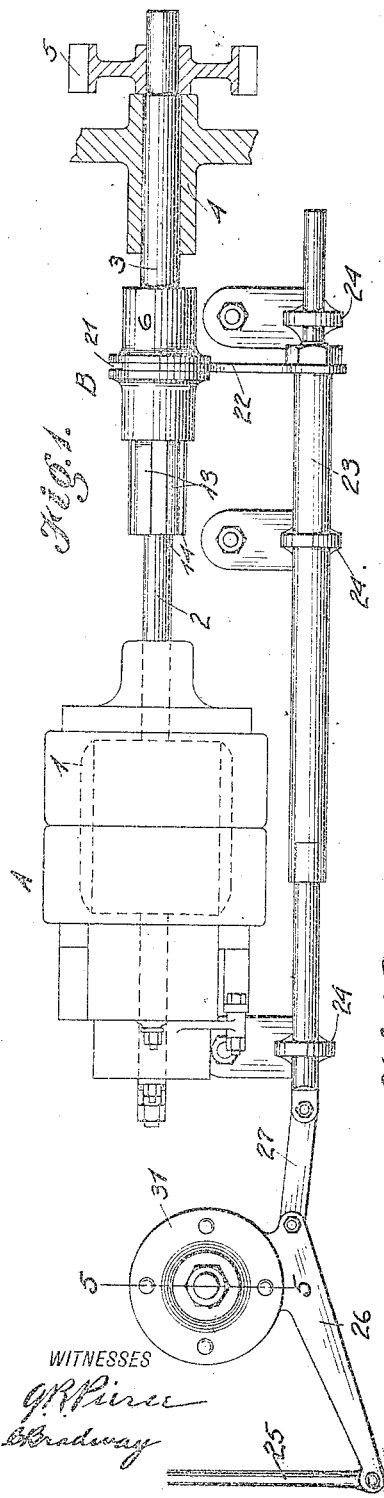
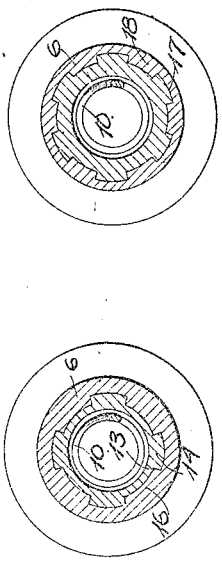
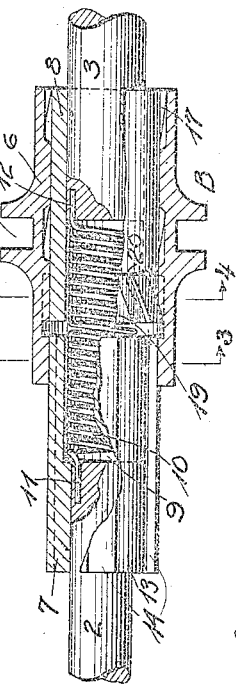
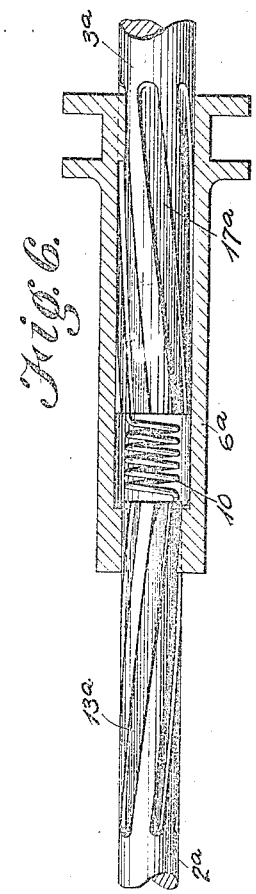
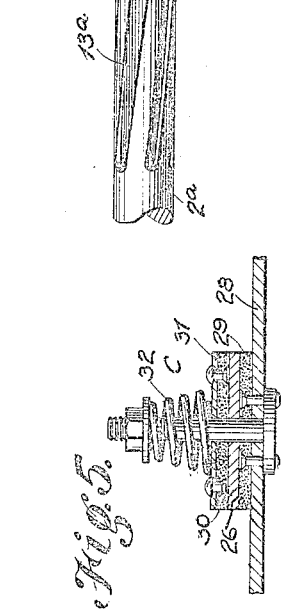
WITNESSES
INVENTOR
John W. Montague
BY
ATTORNEYS

UNITED STATES PATENT OFFICE.

JOHN WESLEY MONTAGUE, OF WINNIPEG, MANITOBA, CANADA.

IGNITION-MAGNETO DRIVING-COUPLING.

1,150,694.  Specification of Letters Patent.  Patented Aug. 17, 1915.

Application filed October 6, 1914. Serial No. 865,222.

*To all whom it may concern:*

Be it known that I, JOHN W. MONTAGUE, a subject of the King of Great Britain, and a resident of Winnipeg, in the Province of Manitoba and Dominion of Canada, have invented a new and Improved Ignition-Magneto Driving-Coupling, of which the following is a full, clear, and exact description.

This invention relates to ignition magnetos of that type whereby the shifting of the spark is effected by adjusting the relative position of the magneto armature with respect to the driving shaft through a coupling that comprises a slidable sleeve feathered to the respective shafts by worm or helical grooves, whereby the sliding of the sleeve produces relative rotation of the shafts for the purpose of retarding or advancing the spark.

The invention relates more particularly to the adjustable coupling between the driving shaft and the armature shaft, the object of the invention being to prevent lost motion, noise and excessive wear between the coupling sleeve and shafts, and to accomplish this object the shafts have between their opposed ends a helical spring which is subjected to torsion while its ends are connected with the respective shafts, whereby lost motion in the direction of rotation is prevented, and at the same time the spring is subjected to compression so as to prevent relative endwise motion of the shafts. Without the use of a spring considerable noise is produced in the operation of the magneto, due to the fact that, as the armature rotates, it is subjected to periodic magnetic attraction in a direction opposite to rotation and as a certain necessary play is required between the parts of the coupling these opposing forces cause the noise or knocking referred to.

For a more complete understanding of the invention reference is to be had to the following description and claims taken in connection with the accompanying drawing, which illustrates certain embodiments of the invention, and wherein similar characters of reference indicate corresponding parts in all the views, in which—

Figure 1 is a plan view of the apparatus; Fig. 2 is an enlarged sectional view of the coupling; Figs. 3 and 4 are sectional views respectively on the lines 3—3, 4—4, Fig. 2; Fig. 5 is a sectional view on the line 5—5, Fig. 1; Fig. 6 is a sectional view of a modified form of coupling.

Referring to the drawing, A designates an ordinary magneto for the ignition system of a gas engine, in which the armature 1 thereof is connected with a shaft 2 that is driven through a coupling B from a driving shaft 3, the latter being journaled in a bearing 4 and having a gear 5 which is geared to the crank shaft of the engine with which the magneto is used. The magneto is of usual construction and has a make-and-break device or timer associated with the armature so that the circuit will be broken when the current generated by the magneto is of maximum intensity. The object of the coupling B is to shift the armature to vary the time of maximum current intensity, and also to shift the time for making and breaking the circuit by the timer, whereby the spark can be retarded or advanced, as conditions require. The coupling B comprises, as shown in Figs. 2, 3 and 4, a sliding sleeve 6 that embraces the opposed ends of the shafts 2 and 3. These shafts have keyed or otherwise rigidly secured thereto collars 7 and 8 which project beyond their respective shafts to form a chamber 9 in which is arranged a helical spring 10, the ends 11 and 12 of the spring being respectively connected with the shafts 2 and 3. This spring is normally under compression and also under torsional strain, so that there will be no lost play between the parts of the coupling. The collar 7 has longitudinal grooves 13 formed between longitudinal ribs 14, and in the end of the sleeve 6 that receives the shaft 2 are internal ribs 16 which engage between the ribs 14. It will thus be seen that the slidable sleeve 6 is feathered to the collar 7 so as to slide thereon while being capable of rotating the collar 7 and shaft 2. The bore of the sleeve 6 throughout its length, except where the ribs 16 are formed, is of larger diameter than the collar 7, so that the sleeve 6 can slide on the collar 7, and in its portion of larger bore the sleeve is formed with internal helical grooves 17 separated by helical ribs 18, and the inner end of the collar or sleeve 8 has external ribs 19 separated by grooves 20, the ribs and grooves being of the same pitch as the grooves and ribs 17 and 18, so that the ribs of the sleeve 6 will interengage with the ribs on the collar or sleeve 8. It will thus be seen that by shifting the sleeve longitudinally the sleeve will be rotated relatively to the shaft 3, and as a consequence the shaft 2 will be relatively rotated. As the shaft 3 is fixed with respect to the moving parts of the engine, and particularly the piston, the shifting of the sleeve 6 will vary the relation of the armature to the pole pieces of the magneto and thereby change the period of maximum current intensity with relation to the position of the engine piston in the cycle of operation, whereby a retarded or advanced spark can be obtained at the desire of the operator.

Any suitable means may be employed for shifting the coupling sleeve 6, but in the present instance the sleeve is shown with a circumferential groove 21 in which engages a fork 22 fastened to a rod 23, which rod is slidable in suitable bearings 24. The rod is adapted to be operated by means within a convenient reach of the driver, such means embodying a rod 25 which is connected with a lever 26 that is in turn connected by a link 27 with the rod 23. To hold the sleeve in any desired position of adjustment a friction-holding device C is employed in connection with the lever 26. This device comprises a stationary abutment 28 having a leather or other facing 29 which engages one side of the lever 26, and the opposite side of the latter is engaged by a leather facing 30 of a disk 31, which latter is pressed by a spring 32 that operates to frictionally grip the lever 26 between the elements 29 and 30. This clutch device yields to pressure applied by the operator so that the sleeve 6 can be adjusted, but any thrust produced on the sleeve by power transmitted from the engine to the magneto is resisted by the clutch C, so that the sleeve 6 of the coupling B cannot automatically shift.

The coupling may be made as shown in Fig. 6, wherein the shafts 2ᵃ and 3ᵃ are provided with oppositely pitched helical grooves 13ᵃ and 17ᵃ, and the sleeve 6ᵃ will have correspondingly shaped grooves, whereby the sleeve will be feathered on both shafts, and by the shifting of the sleeve the latter is turned on the shaft 3ᵃ, and at the same time the sleeve will turn the shaft 2ᵃ, but to a greater extent in unit length of axial adjustment of the sleeve than is possible with the construction shown in Fig. 2.

It will be understood that the coupling sleeve will have a range of adjustment necessary to advance and retard the spark within the limits of spark adjustment of the engine.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as are within the scope of the appended claims.

Having thus described my invention, I claim as new and desire to secure by Letters Patent:

1. The combination of a driven shaft, a driving shaft, a torsional spring connected with the shafts, a sliding sleeve on the ends of the shafts for producing relative rotation of the latter by the longitudinal movement of the sleeve.

2. The combination of a driven shaft, a driving shaft arranged in end to end relation to the driven shaft, a helical spring disposed between and connected with the opposed ends of the shafts and normally under compression and under torsion, said shafts having longitudinal grooves, the grooves of one shaft being spiral, a sleeve having internal means engaging the grooves of the shafts to spline the latter together for normal rotation as a unit, and means for sliding the sleeve longitudinally over the shafts for producing relative rotation between the shafts.

3. The combination of a driven shaft, a driving shaft arranged in end to end relation to the driven shaft, a helical spring disposed between and connected with the opposed ends of the shafts and normally under compression and under torsion, said shafts having longitudinal grooves, the grooves of one shaft being spiral, a sleeve having internal means engaging the grooves of the shafts to spline the latter together for normal rotation as a unit, means for sliding the sleeve longitudinally of the shafts for producing relative rotation between the shafts, and a brake for the last-mentioned means to prevent longitudinal movement of the sleeve by the rotation of the shafts.

In testimony whereof I have signed my name to this specification in the presence of two subscribing witnesses.

JOHN WESLEY MONTAGUE.

Witnesses:
F. G. BARBER,
CATHERINE SUFFLCA.